US007529399B2

(12) United States Patent
Abe

(10) Patent No.: US 7,529,399 B2
(45) Date of Patent: May 5, 2009

(54) GAME MACHINE CIRCUIT BOARD CASE INSPECTION METHOD, AND GAME BOARD OR GAME MACHINE INSPECTION METHOD

(75) Inventor: Koichi Abe, Osaka (JP)

(73) Assignee: Fuji Shoji Co., Ltd., Osaka (JP)

( * ) Notice: Subject to any disclaimer, the term of this patent is extended or adjusted under 35 U.S.C. 154(b) by 937 days.

(21) Appl. No.: 10/509,701

(22) PCT Filed: Jun. 3, 2003

(86) PCT No.: PCT/JP03/07045

§ 371 (c)(1),
(2), (4) Date: Sep. 30, 2004

(87) PCT Pub. No.: WO2004/108236

PCT Pub. Date: Dec. 16, 2004

(65) Prior Publication Data

US 2006/0183539 A1 Aug. 17, 2006

(51) Int. Cl.
*G06K 9/00* (2006.01)
*A63F 13/00* (2006.01)

(52) U.S. Cl. ........................................ 382/145; 463/29

(58) Field of Classification Search ................. 282/141, 282/145; 463/16, 29, 36; 438/16; 348/86, 348/92, 125; 382/141, 145
See application file for complete search history.

(56) References Cited

U.S. PATENT DOCUMENTS 6,599,180 B2 * 7/2003 Seagle ........................ 453/32
2004/0060976 A1 * 4/2004 Blazey et al. ............... 235/375

OTHER PUBLICATIONS

English translation of Japanese patent No. 2001-347038, pp. 1-26, 2001.*

* cited by examiner

*Primary Examiner*—Daniel G Mariam
(74) *Attorney, Agent, or Firm*—Jordan and Hamburg LLP

(57) ABSTRACT

In a game machine circuit board case inspection method, the inspection of a circuit board case 39 storing a control circuit board 38 having a predetermined electronic part 47 mounted thereon is performed through a seal confirming step 15 for confirming whether or not the circuit board case 39 has been sealed by sealing means 49 and 50, and an intrinsic identification information reading step 18 for reading the intrinsic identification information 48 on said electronic part 47 stored in the circuit board case 39 after the seal confirming step 15. Thereby, the reading of the intrinsic identification information affixed to the electronic part on the control circuit board in the circuit board case, and the confirmation of the sealed state of the circuit board case can be reliably effected, thus preventing dishonest acts, such as replacing the electronic part by a new one in the inspection step and allowing the new one to read a dishonest intrinsic identification information.

9 Claims, 9 Drawing Sheets

GAME MACHINE CIRCUIT BOARD CASE INSPECTION METHOD, AND GAME BOARD OR GAME MACHINE INSPECTION METHOD

TECHNICAL FIELD

The present invention relates to a game machine circuit board case inspection method, and a game board or game machine inspection method and is such that after the sealed state of a circuit board case has been inspected, intrinsic identification information on the electronic parts on a control circuit board stored in said case is inspected.

BACKGROUND ART

In a shot ball game machine, such as a pachinko machine, predetermined game parts including a starting means, a pattern display means, and a big prize means are mounted in the game region of a game board. In playing a game, game balls are shot to the game region by shooting means. And, if a game ball is detected by the starting means, under the condition of this detection a plurality of patterns in the pattern display means are varied for a predetermined time, and whether a special game state is to be generated or not is decided on the basis of a random number obtained under the condition of this variation. If there is a decision to the effect that the special game state should be generated, a patterns after the variation is stopped in a particular manner, whereupon the special game state to open the opening/closing plate of the big prize means is generated. The big prize means closes the opening/closing plate when a predetermined time has passed since the opening or when a predetermined number of game balls win prizes during the opening. Further, under the condition that game balls pass through the particular region, the special game state, that is, the opening of the big prize means, is repeated predetermined times at a maximum.

Game moves taking place in the game board, including lottery or the like to decide whether or not such special game state is to be generated, are controlled by a main control circuit board stored in a main circuit board case on the back of the game machine main body. Therefore, if predetermined electronic parts including ROMs on the main control circuit board are dishonestly replaced by those which provide a higher probability of generation of the special game state or the like, the special game state can be easily generated.

Accordingly, the method heretofore employed is such that as the predetermined electronic parts including ROMs, those having intrinsic identification information, such as a serial number, applied thereto are used on the one hand and on the other hand after the main control circuit board having the predetermined electronic parts mounted thereon has been stored in the main circuit board case, the latter is sealed by a sealing means which, when opened, will leave a trace of opening. Thereby, if such sealing means are inspected in game parlors or the like, the presence or absence of a dishonest act can be decided, e.g., by the presence or absence of a trace of opening the sealing means, or by a difference in the intrinsic identification information on the electronic parts.

In assembling a pachinko machine or the like provided with a circuit board case disposed on the back of the game machine main body and having such main control circuit board stored therein, it is necessary for game machine makers to confirm and record the intrinsic identification information on the electronic parts and to reliably seal the main circuit board case by the sealing means.

In the prior art, however, since the intrinsic identification information on the electronic parts and the sealing state of the sealing means are visually confirmed by the operator in the inspection step subsequent to the assembling of a pachinko machine, there is a danger of omission of inspection or the like to overlook the state of the sealing means despite the fact that the sealing means has not sealed.

Further, in the case of confirming the intrinsic identification information on the electronic parts prior to sealing the main circuit board case and then sealing the main circuit board case by the sealing means, it cannot be absolutely denied that between the confirmation of the intrinsic identification information on the electronic parts and the sealing of the main circuit board case, there is a dishonest act, e.g., to open the main circuit board case to replace the main control circuit board by a new one and to let the latter read a dishonest intrinsic identification information.

With these prior art problems in mind, the invention has for its object the provision of a game machine circuit board case inspection method, and a game board or game machine inspection method, which are capable of reliably effecting the reading of intrinsic identification information applied to electronic parts on a control circuit board in a circuit board case and confirming the sealed state of a circuit board case and also capable of preventing a dishonest act, e.g., to replace electronic parts and let them read dishonest intrinsic identification information in an inspection step.

DISCLOSURE OF THE INVENTION

The invention provides a game machine circuit board case inspection method which inspects a circuit board case 39 storing a control circuit board 38 having a predetermined electronic part 47 mounted thereon, the method comprising a seal confirming step 15 for confirming whether or not said circuit board case 39 is sealed by sealing means 49 and 50, and an intrinsic information reading step 18 for reading the intrinsic identification information 48 on said electronic part 47 in said circuit board case 39 subsequent to said seal confirmation step 15. Therefore, the reading of the intrinsic identification information 48 applied to the electronic part 47 on the control circuit board 38 in the circuit board case 39, and the confirmation of the sealed state of the circuit board case 39 can be reliably effected. Furthermore, since the intrinsic identification information 48 is read after the confirmation of the sealed state, it is possible to prevent a dishonest act, e.g., to replace the electronic part 47 by a new one and let the latter read dishonest intrinsic identification information 48 in an inspection step.

Another present invention provides a game board or game machine inspection method which inspects a game board 23 or a game machine 20 having a circuit board case 39 storing a control circuit board 38 having a predetermined electronic part 47 mounted thereon, the method comprising a seal confirming step 15 for confirming whether or not said circuit board case 39 is sealed by sealing means 49 and 50, and an intrinsic information reading step 18 for reading the intrinsic identification information 48 on said electronic part 47 in said circuit board case 39 subsequent to said seal confirming step 15. Therefore, the reading of the intrinsic identification information 48 applied to the electronic part 47 on the control circuit board 38 in the circuit board case 39, and the confirmation of the sealed state of the circuit board case 39 can be reliably effected. Furthermore, since the intrinsic identification information 48 is read after the confirmation of the sealed state, it is possible to prevent a dishonest act, e.g., to replace the electronic part 47 by a new one and let the latter read dishonest intrinsic identification information 48 in an inspection step.

BEST MODE FOR CARRYING OUT THE INVENTION

Figure 1:
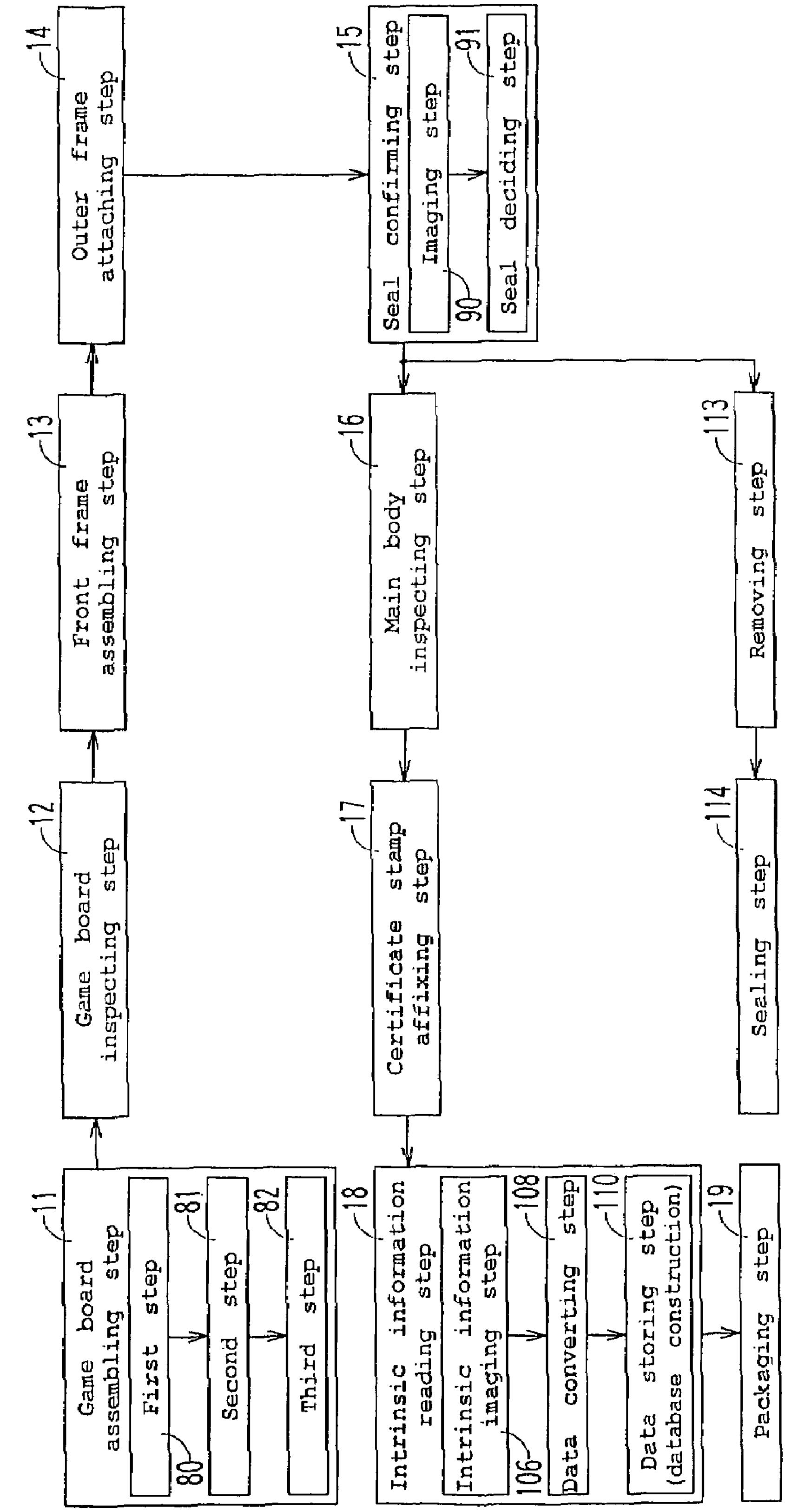
FIG. 1 is an explanatory view of a pachinko machine assembling line, showing a first embodiment of the present invention.
Figure 2:
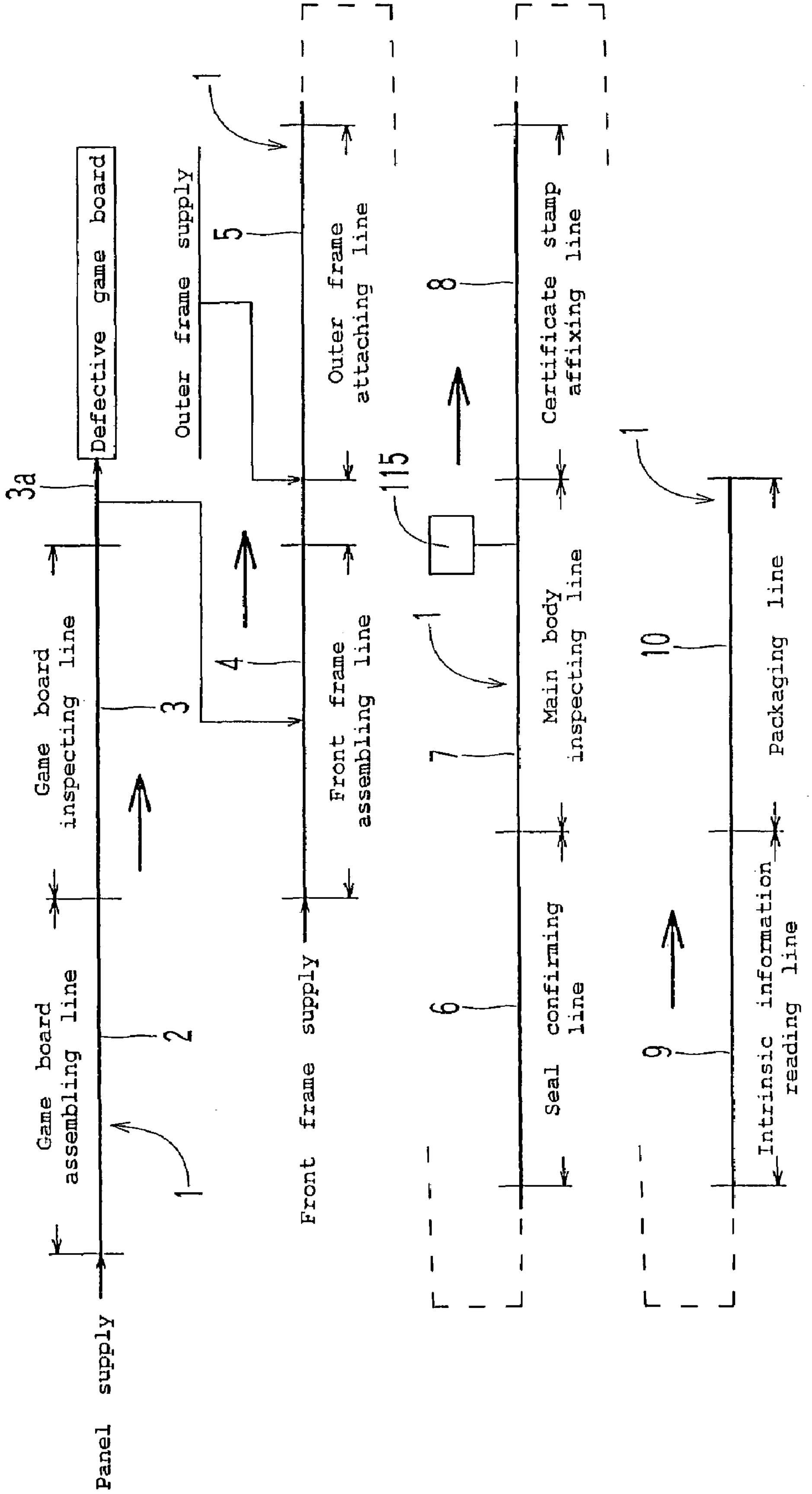
FIG. 2 is a step diagram of the pachinko machine assembling line.

Each embodiment of the invention will now be described with reference to the drawings. FIGS. 1 through 11 show by way of example a first embodiment of the invention as applied to a pachinko machine assembling line. In this assembling line, as shown in FIGS. 1 and 2, a game board assembling line 2, a game board inspecting line 3, a front frame assembling line 4, an outer frame attaching line 5, a seal confirming line 6, a main body inspecting line 7, a certificate stamp affixing line 8, an intrinsic information reading line 9, and a packaging line 10 are linearly arranged along a transfer line 1 having a plurality of conveyors and other required devices suitably connected.

And, in this assembling line, a series of operations for assembling, inspecting and packaging a pachinko machine 20 are performed through a game board assembling step 11, a game board inspecting step 12, a front frame assembling step 13, an outer attaching step 14, a seal confirming step 15, a main body inspecting step 16, a certificate stamp affixing step 17, an intrinsic information reading step 18, and a packaging step 19 in the respective lines 2 through 10.

Figure 3:
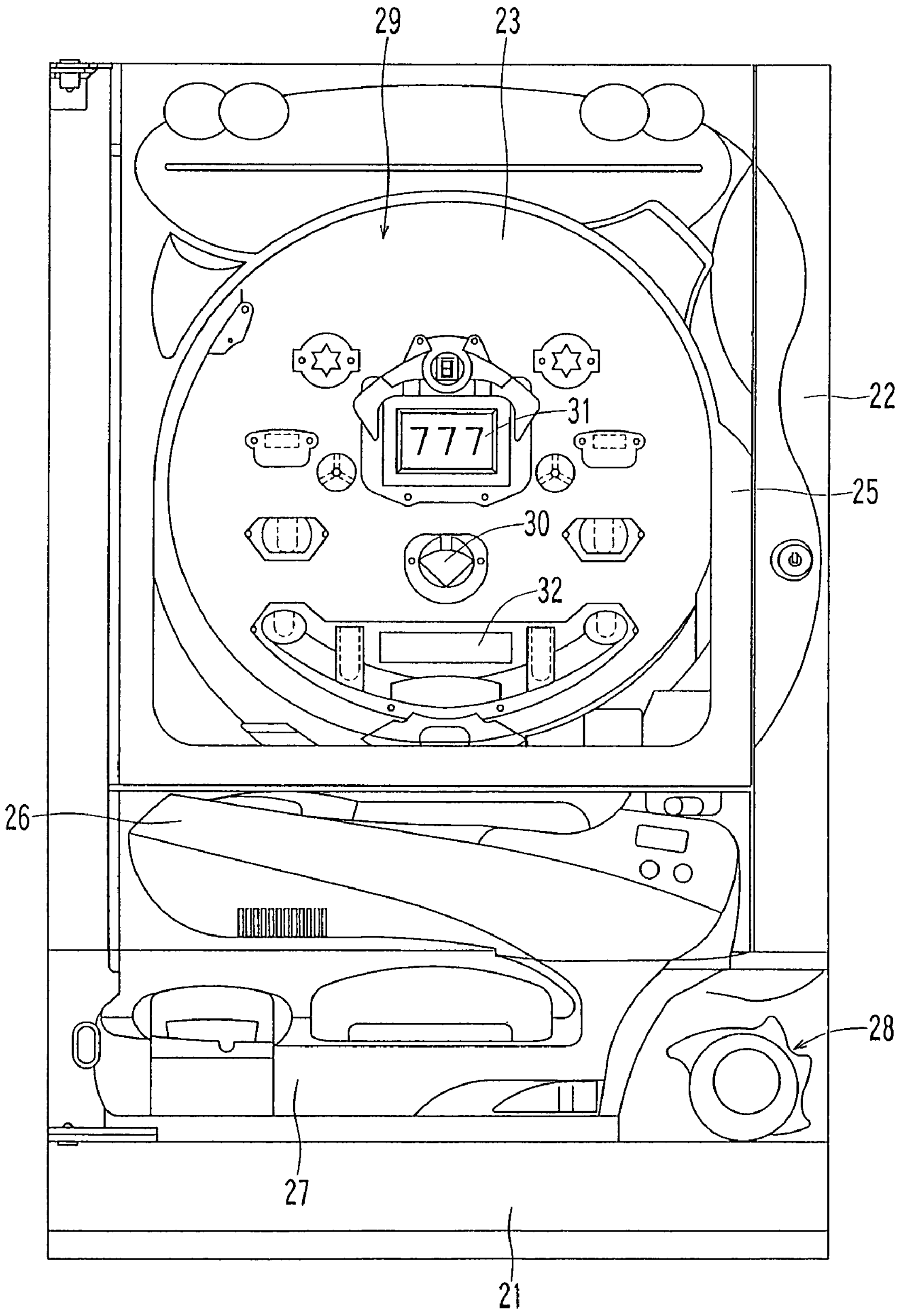
FIG. 3 is a front view of a pachinko machine.
Figure 4:
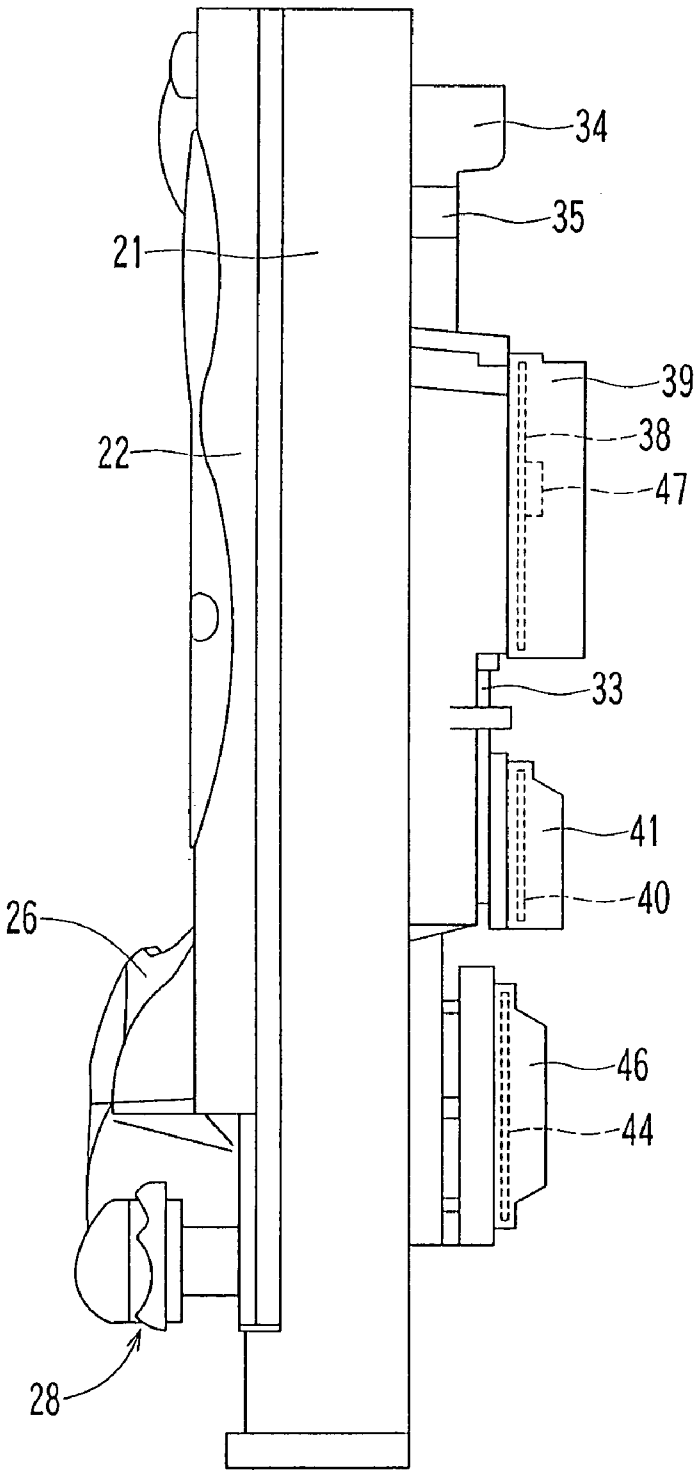
FIG. 4 is a side view of the pachinko machine.
Figure 5:
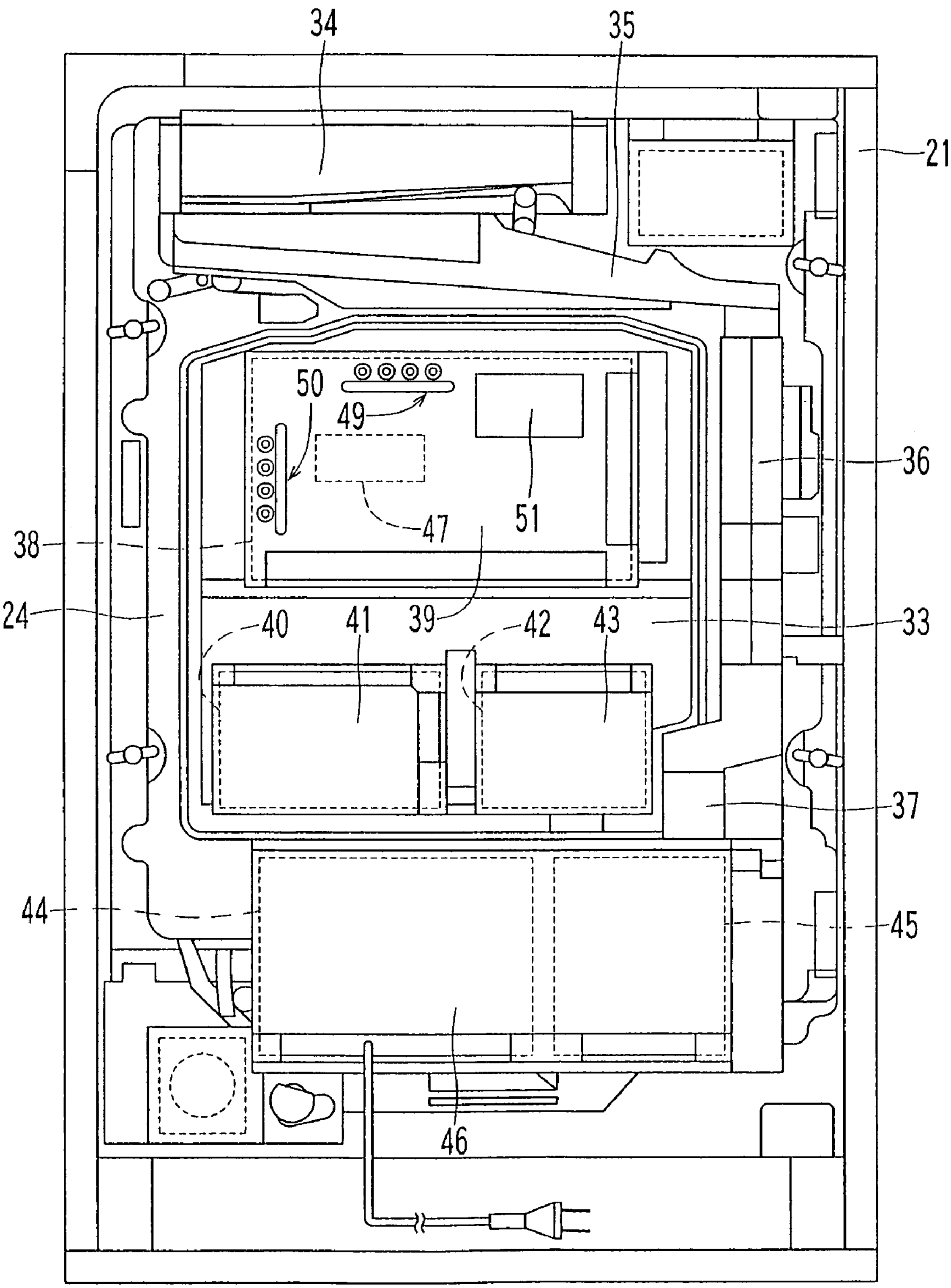
FIG. 5 is a back view of the pachinko machine.

The pachinko machine 20, which is a subject of assembly and inspection, as shown in FIGS. 3 through 5, comprises an outer frame 21, a front frame 22 removably and openably/closably pivoted to said outer frame 21, a game board 23 removably mounted on the front frame 22, and a back mechanism plate 24 openably/closably mounted on the back of the front frame 22. In addition, the otter frame 21 and front frame 22 constitute the game machine main body.

The front frame 22 comprises a glass door 25, an upper tray unit 26, a lower tray unit 27, a shooting means 28, etc. The game board 23 has various game parts mounted in a game region 29, including a starting means 30, a pattern display means 31, and a big prize means 32, while the back of the game board 23 has a back cover 33 mounted thereon for covering the game parts from the back. The back mechanism plate 24 has a game ball tank 34, a tank rail 35, a dispensing means 36, a passage unit 37, etc., mounted thereon, the arrangement being such that in response to a rental ball dispensation request, a prize ball dispensation request or the like, the dispensing means 36 dispenses game balls in the game ball tank 34 as rental balls or prize balls into the upper tray unit 26.

The back of the back cover 33 has mounted thereon a main circuit board case 39 for storing the main control circuit board 38, a lamp circuit board case 41 for storing a lamp control circuit board 40, an acoustic circuit board case 43 for storing an acoustic control circuit board 42, etc. Further, the back of the passage unit 37 has mounted thereon a circuit board case 46 for storing a power source circuit board 44 and a dispensation control circuit board 45.

Figure 6:
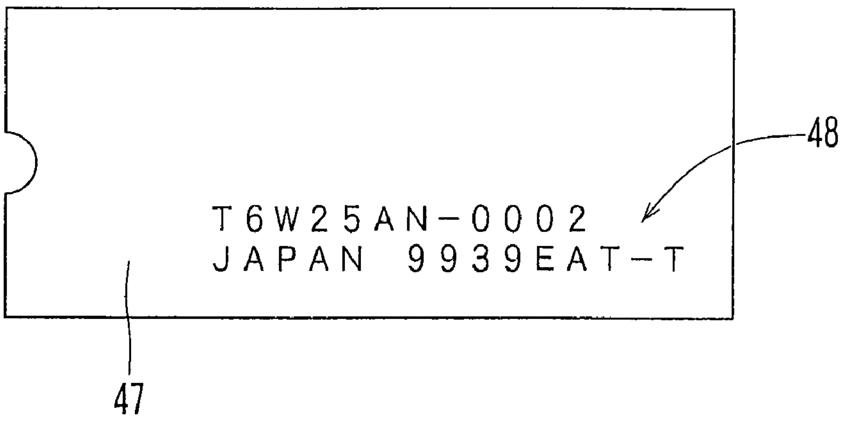
FIG. 6 is a front view of an electronic part.

The main control circuit board 38, which controls game actions performed by game parts on the game board 23, has packaged thereon one or more electronic parts 47 including an IC element, such as a CPU, a ROM, and a RAM, the arrangement being such that game actions are controlled by the electronic part 47. And, this electronic part 47, as shown in FIG. 6, has the model name of the pachinko machine 20, and the maker's name indicated thereon, and besides these, it has intrinsic identification information 48 added by the maker indicated thereon as by printing, in such a manner that it can be deciphered from outside the main circuit board case 39. The intrinsic identification information 48 consists of a chip management number (serial number) and a chip lot number and makes it possible to specify the electronic part 47.

The main circuit board case 39, which is made of transparent synthetic resin material allowing the main control circuit board 38 to be seen therethrough, is openably/closably constructed as the need arises. The main circuit board case 39 has one or more sealing means, e.g., two, a first sealing means 49 and a second sealing means 50 installed at suitable places on the back thereof for sealing the main circuit board case 39 in its closed state, and has a management certificate stamp 51 for circuit board management affixed at a suitable place on the back thereof in such a manner that it cannot or can hardly be peeled.

Figure 8:
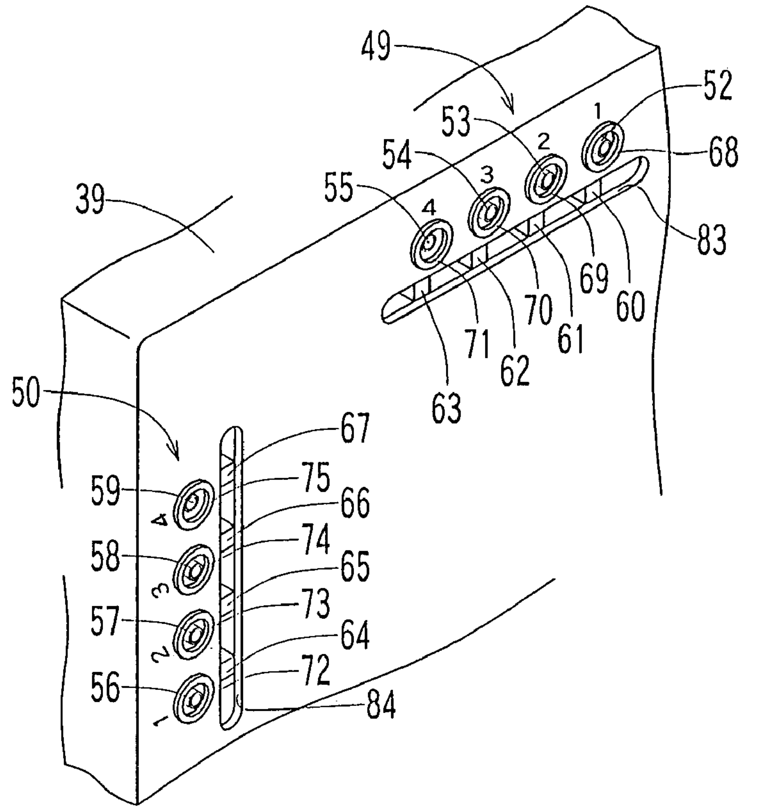
FIG. 8 is a perspective view of sealing means.

The individual sealing means 49 and 50, as shown in FIG. 8, comprise push-in type or other type sealing pins 52-55 and 56-59 for locking the main circuit board case 39 in its closed state, the arrangement being such that after any one of the sealing pins 52-55 and 56-59 of the sealing means 49 and 50 has been pushed in to seal the main circuit board case 39, the seal cannot be opened unless destructive sections 60-63 and 64-67 disposed in the sealing pins 52-55 and 56-59 or in the vicinity thereof are destructed and such that when the seal is opened, traces of opening are left in the destructive sections 60-63 and 64-67.

The sealing means 49 and 50 have a plurality of, e.g., four sealing pins 52-55 and 56-59 arranged in a row along the side edges of the main circuit board case 39; ring-like projections 68-71 and 72-75 formed in the main circuit board case 39 in such a manner as to surround the heads of the sealing pins 52-55 and 56-59; and destructive sections 60-63 and 64-67 formed in the main circuit board case 39 to correspond to the sealing pins 52-55 and 56-59, thus allowing sealing and opening four times. The sealing pins 52-55 and 56-59 have their heads normally projected by substantially the same degree as that of the projections 68-71 and 72-75, the arrangement being such that when they are pushed in to seal the main circuit board case 39, the heads are retracted from the projections 68-71 and 72-75. When it is desired to open the main circuit board case 39, the destructive sections 60-63 and 64-67 corresponding to the sealing pins 52-55 and 56-59 which have sealed are cut for destruction by a tool from the sides associated with the openings 83 and 84, thereby opening the lock to the main circuit board case 39 established by the sealing pins 52-55 and 56-59.

Of the four sealing pins 52-55 and 56-59, the first-time sealing pins 55 and 59 used for the pachinko machine maker to seal the main circuit board case 39 are colored with a color different from that of the sealing pins 52-54 and 56-58 in order to facilitate the confirmation of the sealing state in the seal confirming step 15. In addition, the sealing means 49 and 50 are substantially the same in construction, but they may be of different kinds. Further the sealing pins 52-55 and 56-59 may be different in color or they may be the same in color.

Figure 7:
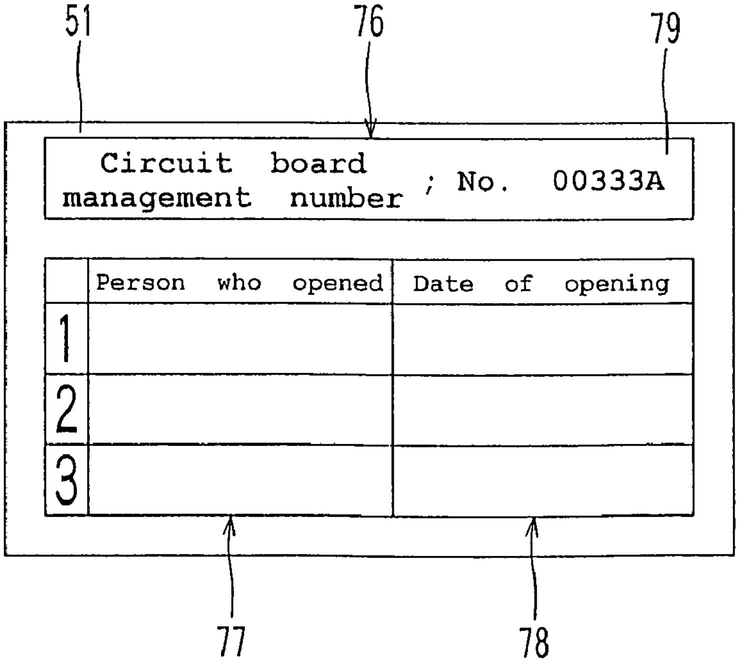
FIG. 7 is a front view of a management certificate stamp.

The management certificate stamp 51, as shown in FIG. 7, has the model name of the pachinko machine 20 printed thereon, and besides this, it is provided with a circuit board management number column 76, an opener entry column 77, an opening date entry column 78, etc. The circuit board management number column 76 has a predetermined circuit board management number indicated thereon by the pachinko machine maker as circuit board identification information 79 intrinsic to the main control circuit board 38 stored in the main circuit board case 39.

The game board assembling line 2 is a line for executing the game board assembling step 11 for assembling the game board 23. In this game board assembling line 2, devices including a nailer, and a rail assembling machine are arranged along the transfer line 1, and the game board assembling step 11 is performed such that required parts are successively mounted on a panel, such as plywood, supplied from the upstream region to complete the game board 23. The game board assembling step 11, as shown in FIG. 1, includes, e.g., a first step 80 for mounting game nails and guide rail on the front of the panel, a second step 81 for mounting game parts, etc., outside and inside the guide rail of the panel, and a third step 82 for mounting the back cover 33, the main circuit board case 39, etc., on the back of the panel, and it is through these steps, from the first step 80 to the third step 82, that the game board 23 is assembled.

In the game board assembling step 11, the main circuit board case 39 having the first-time sealing applied thereto by the sealing pins 55 and 59 on the end sides of the sealing means 49 and 50 is used, and it is made impossible to apply dishonest work to the electronic part 47 on the main control circuit board 38 in the region downstream of the game board assembling step 11. In addition, in this game board assembling step 11, the main control circuit board 38 may be put in the main circuit board case 39 and then the sealing pins 55 and 59 of the sealing means 49 and 50 may be pushed in for sealing. Further, inspection steps including nail inspection, game parts inspection, etc., may be included somewhere in the game board assembling step 11 as the need arises so as to inspect the game nails, the game parts, etc.

The game board inspecting line 3 is a line for executing the game board inspecting step 12 for inspecting the game board 23 after the latter has been assembled. This game board inspecting line 3 has a predetermined inspection table disposed along the transfer line 1. And, the game board inspecting step 12 conducts various inspections including whether or not the electrically operated game parts and various inspection switches mounted on the game board 23 are normal or whether or not the electrically operated game parts etc., are normally operable by the control of the main control circuit board 38. If there are defective parts in the game board 23, they are suitably repaired, and those which cannot be repaired are removed through a removing conveyor 3*a*, etc.

The front frame assembling line 4 is a line for executing the front frame assembling step 13 for assembling the front frame 22. In the front frame assembling step 13, the upper tray unit 26, back mechanism plate 24, etc., are mounted on the front and rear of the front frame 22 supplied from the upstream region, while the game board 23 inspected in the game board inspecting line 12 is mounted on the front frame 22, with cables, etc., connected at required places to complete the front frame 22. In addition, the game ball tank 34, dispensing means 36, etc., may be mounted on the back mechanism plate 24 in advance.

The outer frame attaching line 5 is a line for executing the outer frame attaching step 14 for attaching the outer frame 21 to the front frame 22. In the outer frame attaching step 14, the outer frame 21 is attached to the front frame 22 completed in the front frame assembling step 13. This attachment of the outer frame 21 completes all the assembling of the pachinko machine 20.

Figure 9:
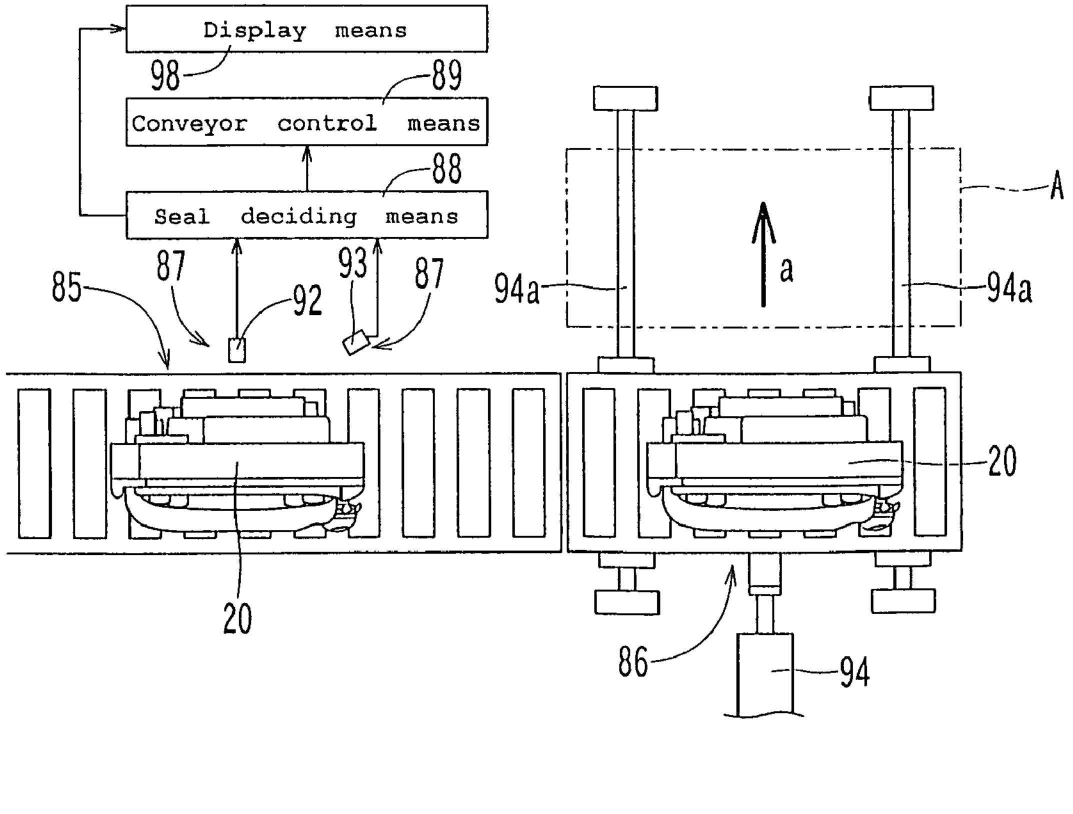
FIG. 9 is a structural view of a seal confirming line.

The seal confirming line 6 is a line for executing the seal confirming step 15 for confirming whether or not the main circuit board case 39 has been sealed by the sealing means 49 50 with the completed pachinko machine 20 being a subject of inspection. The seal confirming line 6, as shown in FIG. 9, comprises a first conveyor 85 disposed on the transfer line 1, a second conveyor 86 disposed downstream of the first conveyor 85 and movable transversely (in a direction orthogonal to the transfer direction), a seal imaging means 87 disposed in the vicinity of the side of the first conveyor 85, a seal deciding means 88 for image-processing the image data obtained by the seal imaging means 87 and deciding, on the basis of this processing, whether or not the sealing means 49 and 50 have sealed, a display means 98 for displaying the image obtained by imaging, the result of the decision, etc., and a conveyor control means 89 for controlling the first and second conveyors 85 and 86.

The seal confirming step 15 includes an imaging step 90 for imaging the sealing states of the sealing means 49 and 50 by the seal imaging means 87, and a seal deciding step 91 for analyzing the image data obtained in the imaging step 90 so as to decide whether or not the sealing means 49 and 50 have sealed. When the assembled pachinko machine 20 reaches the first conveyor 85 of the seal confirming line 6, first the sealing states of the sealing means 49 and 50 of the pachinko machine 20 standing upright on the first conveyor 85 are imaged from the back by the seal imaging means 87 in the imaging step 90, and then, in the next seal deciding step 91, the image data are image-processed and whether or not the sealing means 49 and 50 have properly sealed is decided on the basis of the result of said processing.

The seal imaging means 87 comprises a first seal imaging camera 92 for imaging the first sealing means 49 of the main circuit board case 39, and a second seal imaging camera 93 for imaging the second sealing means 50. The seal imaging cameras 92 and 93 are in the form of CCD cameras or the like and are set in such a manner as to obliquely image the heads of the sealing pins 55 and 59 of the sealing means 49 and 50.

The first conveyor 85 is arranged such that during the imaging of the sealing states of the sealing means 49 and 50, the pachinko machine 20, which is a subject of inspection, is stopped at positions corresponding to the seal imaging cameras 92 and 93 and after the imaging of the sealing means 49 and 50, the pachinko machine 20 is transferred to the second conveyor 86. The second conveyor 86 is provided with a transversely moving cylinder 94 or the like, so that if the sealing means 49 and 50 have properly sealed, the pachinko machine 20 is transferred downstream along the transfer line 1. On the other hand, if the sealing of the sealing means 49 and 50 is defective, the cylinder 94 is driven to guide the second conveyor 86 so as to move the latter transversely along the guide rail 94*a* in the direction of arrow a which is substantially orthogonal to the transfer line 1, thereby removing the pachinko machine 20 from the transfer line 1 to the sealing work position A, where the sealing mean 49 and 50 seal again and then the pachinko machine 20 is sent back to the transfer line 1 for transfer to the downstream region.

In addition, the second conveyor 86 constitutes a removing line for removing a pachinko machine 20 whose sealing means 49 and 50 have defectively sealed from the transfer line 1 to the sealing work position A. Therefore, between the seal confirming step 15 and the intrinsic information reading step 18, there is a removing step 113 for removing a pachinko machine 20 whose sealing means 49 and 50 are not in their sealing position from the transfer line 1, so that if there is a pachinko machine 20 with defective sealing, the pachinko machine 20 is removed to the sealing work position A in the removing step 113 by the second conveyor 86. At the sealing work position A, the sealing work step 114 for pushing in the sealing pins 55 and 59 of the sealing means 49 and 50 to effect sealing is executed, and the thus-sealed pachinko machine 20 is sent back to the transfer line 1 by the second conveyor 86.

Figure 10:
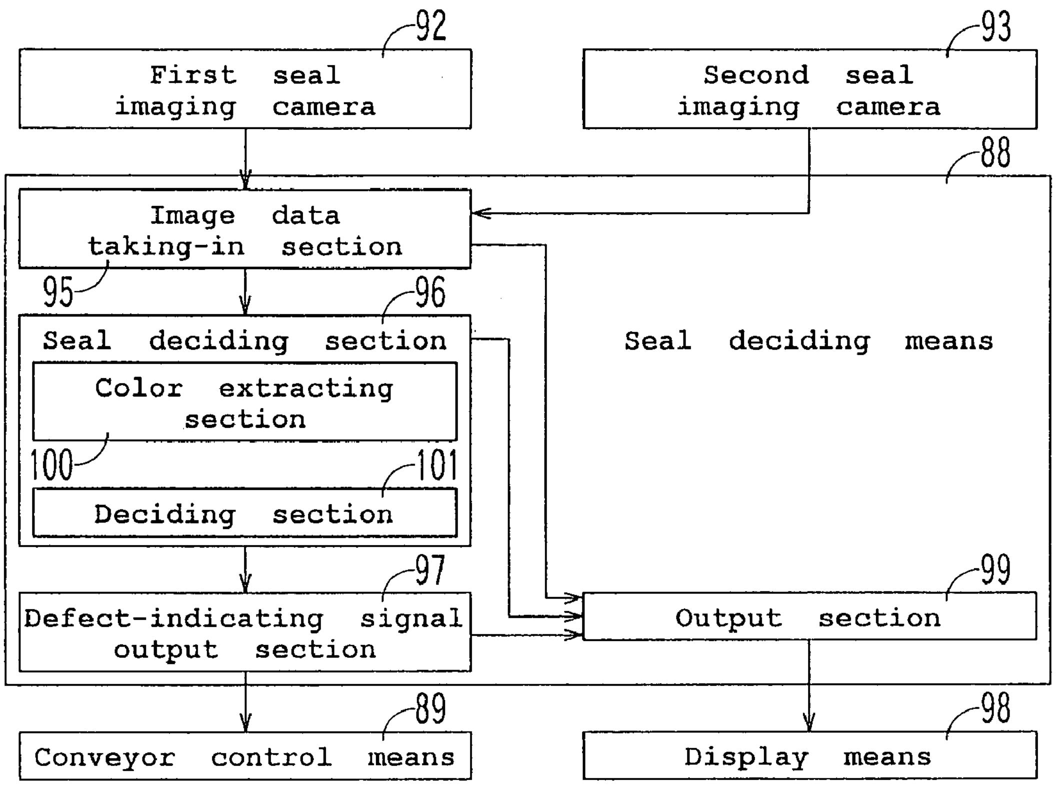
FIG. 10 is a block diagram of a seal deciding means.

The seal deciding means 88, as shown in FIG. 10, comprises an image data taking-in section 95 for taking in the image data from the seal imaging cameras 92 and 93 of the seal imaging means 87, a seal deciding section 96 for deciding whether or not sealing is good or bad from the image data, a defect-indicating signal outputting section 97 for outputting a defect-indicating signal when the seal deciding section 96 decides that the sealing is defective, and an output section 99 for outputting the image obtained by imaging, the result of decision, etc., to the display means 98 on the basis of the data, signals, etc., from the image data taking-in section 95, the seal deciding section 96 and defect-indicating signal outputting section 97.

The seal deciding section 96 comprises a color extracting section 100 for extracting the pixels of the colors of the sealing pins 55 and 59 from the image data, and a deciding section 101 for comparing the number of extracted pixels of the color extracted by the color extracting section 100 or the proportion of the extracted pixels accounted for by the pixels with a threshold value for the reference of decision to thereby make a decision. In the case where the number of pixels or the pixel proportion exceeds the threshold value, the deciding section 101 gives a decision of defective sealing. That is, since the heads of the sealing pins 55 and 59 are projected by the same degree as that of the projections 71 and 75 before sealing and since the heads are retracted below the projections 71 and 75 after sealing, if the heads of the sealing pins 55 and 59 are obliquely imaged by the seal imaging cameras 92 and 93, the number of extracted pixels of the sealing pins 55 and 59 extracted by the color extracting section 100 varies before and after sealing. Therefore, comparing the number of extracted pixels or the like with the reference value for decision makes it possible to decide whether or not the sealing means 49 and 50 have properly sealed.

In the case where the seal deciding section 96 decides that the sealing is defective, the defect-indicating signal output section 97 outputs a defect-indicating signal to the conveyor control means 89. The conveyor control means 89 has the function of controlling the first conveyor 85 such that the latter stops each time a pachinko machine 20 which is a subject of inspection reaches the predetermined imaging position, and transfers the pachinko machine 20 to the second conveyor 86 after the imaging of the sealing means 49 and 50 by the seal imaging means 87; and the function of controlling the second conveyor 86, the cylinder 94, etc., such that in the case where the seal deciding section 88 decides that the sealing is defective, the second conveyor 86 is stopped after the pachinko machine 20 in question is placed on the second conveyor 86, whereupon the second conveyor 86 is transversely moved from the transfer line 1 to the sealing work position A, and after the sealing means 49 and 50 have sealed at the sealing work position A, the second conveyor 86 is sent back to the transfer line 1 to transfer the pachinko machine 20 downstream.

Seal confirmation is performed such that when the pachinko machine 20 reaches the imaging position on the first conveyor 85, the latter stops so that the pachinko machine 20 stops at the imaging position, in which stopped state the seal imaging cameras 92 and 93 image the sealing pins 55 and 59 of the sealing means 49 and 50, and the seal deciding means 88 decides whether the sealing state of the sealing means 49 and 50 is good or bad on the basis of the image data. The seal deciding means 88 subjects the image data to filtration in the color extracting section 100 to extract the pixels of the colors of the sealing pins 55 and 59 for the respective sealing means 49 and 50. And, the seal deciding section 96 compares the number of extracted pixels with the reference for decision and if the number of extracted pixels exceeds the reference for decision, for example, it decides that the sealing by the sealing means 49 and 50 is defective.

If any one of the two sealing means 49 and 50 is defective in sealing, the defect-indicating signal output section 97 outputs a defect-indicating signal according to the decision of being defective from the seal deciding section 96 at that time. And, when the pachinko machine 20 given a decision of being defective in sealing moves from the first conveyor 85 onto the second conveyor 86, the latter stops transferring and moves from the transfer line 1 to the seal working position A in the direction of arrow a, and the pachinko machine 20 defective in sealing is removed from the transfer line 1. At the seal work position A, the sealing pins 55 and 59 of the sealing means 49 and 50 given a decision of being defective in sealing are pressed to seal the main circuit board case 39. After this sealing, the second conveyor 86 moves to the transfer line 1 to transfer the pachinko machine 20 downstream. In the case where the sealing means 49 and 50 are incapable of sealing, the pachinko machine 20 in question is removed from the seal work position A. In addition, the pachinko machine 20 after being sealed may be sent back to the first conveyor 85 so as to confirm the sealed state again.

The main body inspecting line 7 is used to execute the main body inspecting step 16 for final inspection of the pachinko machine 20 after confirmation of sealing, with a repairing table 115 installed downstream and laterally of the main body inspecting line 7. In the main body inspecting step 16, the final inspection of each pachinko machine 20 after confirmation of sealing is conducted. And, if there is a defective place, the pachinko machine 20 in question is taken out onto the repairing table 115 and repaired, whereupon it is sent back to the transfer line 1.

The certificate stamp affixing line 8 is used to execute the certificate stamp affixing step 17 for affixing the management certificate stamp 51 to the main circuit board case 39 of the pachinko machine 20. The pachinko machine 20 subjected to the final inspection is sent to the certificate stamp affixing line 8 by the transfer line 1, and the management certificate stamp 51 having the circuit board identification information 79, etc., printed thereon in the certificate stamp affixing step 17 for the certificate stamp affixing line 8 is affixed to the main circuit board case 39. The affixing of the management certificate stamp 51 may be automatically effected by an affixing machine or it may be effected manually.

Figure 11:
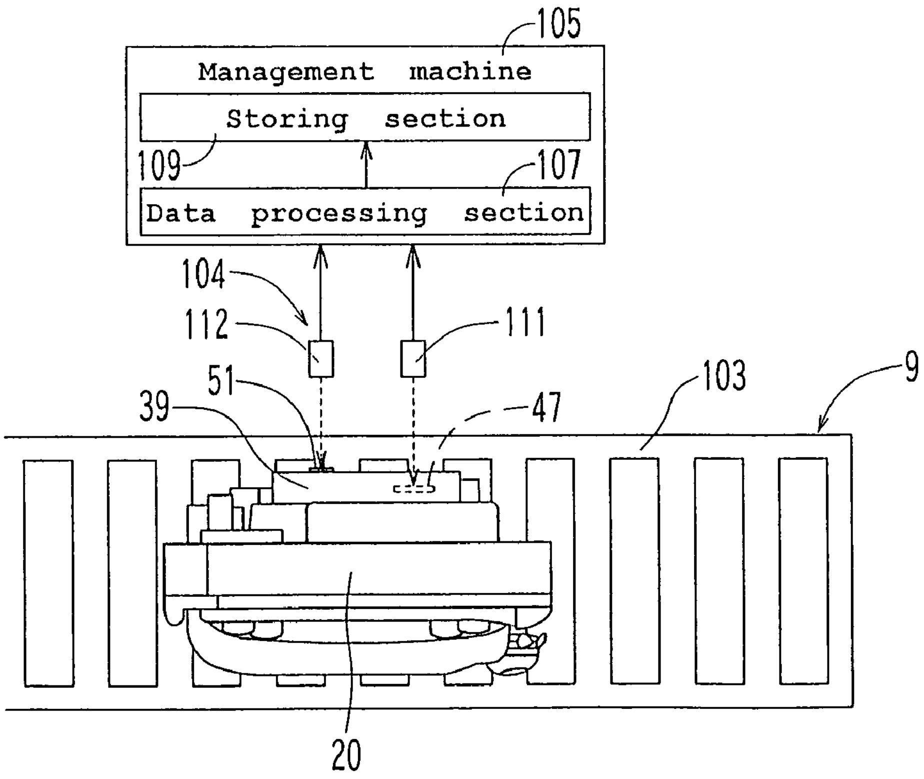
FIG. 11 is a structural view of an intrinsic information reading line.

The intrinsic information reading line 9 is a line for executing the intrinsic information reading step 18 for reading the intrinsic information on the pachinko machine 20. The intrinsic information reading line 9, as shown in FIG. 11, is provided with a third conveyor 103 disposed on the transfer line 1, and an information imaging means 104 disposed laterally, and in the vicinity, of the third conveyor 103. The information imaging means 104 is connected to a management machine 105, such as a personal computer, suitably through an interface or the like.

And, the intrinsic information reading step 18 includes an intrinsic information imaging step 106 for imaging intrinsic information, such as the intrinsic identification information 48 on the electronic part 47 and the circuit board identification information 79 of the main circuit board case 39, a data converting step 108 in which the data processing section 107 of the management machine 105 analyzes the imaged intrinsic information to convert it into predetermined data, and a data storing step 110 for storing said predetermined data in the storing section 109 of the management machine 105; and a database for management is constructed in the data storing step 110.

The information imaging means 104 is provided with a first information imaging camera 111 for imaging the intrinsic identification information 48 applied to the electronic part 47 of the main control circuit board 38 in the main circuit board case 39, and a second information imaging camera 112 for imaging the circuit board identification information 79 entered in the management certificate stamp 51 of the main circuit board case 39. The information imaging cameras 111 and 112 are each composed of a CCD camera or the like, and the first information imaging camera 111 is focused on the intrinsic identification information 48 on the electronic part 47 and so is the second information imaging camera 112 on the circuit board identification information 79 of the main circuit board case 39.

The management machine 105 is arranged to take in image data including the intrinsic identification information 48 and circuit board identification information 79 imaged by the information imaging cameras 111 and 112 of the information imaging means 104, to analyze the image data so as to convert it into character data for the intrinsic identification information 48 and circuit board identification information 79, and to construct a database for management on the basis of the character data for the intrinsic identification information 48 and circuit board identification information 79. In addition, the database is constructed by combining the intrinsic identification information 48 and circuit board identification information 79 with the machine model name, the date of manufacture, the date of shipment, the name of the destination game parlor, the date of reception, and other necessary data.

When each pachinko machine 20 subjected to the final inspection reaches a predetermined position associated with the third conveyor 103, the latter stops to thereby stop the pachinko machine 20. And, the information imaging cameras 111 and 112 of the information imaging means 104 image the intrinsic identification information 48 on the electronic part 47 and the circuit board identification information 79, whereupon the third conveyor 103 is started to transfer the pachinko machine 20 downstream. When the information imaging cameras 111 and 112 image the intrinsic identification information 48 and the circuit board identification information 79, the management machine 105 takes in and analyzes the image data, and converts the image data into character data. And, thereafter, the management machine 105 constructs a database on the basis of the intrinsic identification information 48, and circuit board identification information 79 and stores the data in the corresponding column of a data table.

The sealing states of the sealing means 49 and 50 are confirmed in this manner and upon completion of the final inspection of the pachinko machine 20, the intrinsic identification information 48 on the pachinko machine 20, the circuit board identification information 79, etc., are imaged and read by the information imaging means 104, and a database for circuit board management is constructed on the basis of the intrinsic identification information 48, the circuit board identification information 79, etc.; thus, such database can be easily constructed. Further, dishonest acts can be reliably prevented during a period from the sealing of the main circuit board case 39 to the reading of the intrinsic identification information 48 and circuit board identification information 79.

Further, if a database for circuit board management is constructed on the basis of the intrinsic identification information 48, circuit board identification information 49, etc., then in the case where there is an inquiry, such as a doubt about dishonest act on the main control circuit board 38 of a certain pachinko machine 20, from a game parlor, the intrinsic identification information 48 on the electronic part 47 can be found by detection on the basis of the circuit board identification information 79, etc. Therefore, by comparing the intrinsic identification information 48 on the electronic part 47 on the database with the intrinsic identification information 48 on the electronic part 47 mounted on the main control circuit board 38 of the actual pachinko machine 20, whether or not the electronic part 47 is a dishonestly substituted one can be easily decided.

The packaging line 10 is used to execute the packaging step 19 for packaging the pachinko machine 20 after being assembled. In the packaging step 19, pachinko machines 20 whose intrinsic information has been read are individually packaged in packing cases or the like in such a manner as to enable shipment. Thereby, the operation ranging from assembling to packaging of the pachinko machine 20 is completed.

Figure 12:
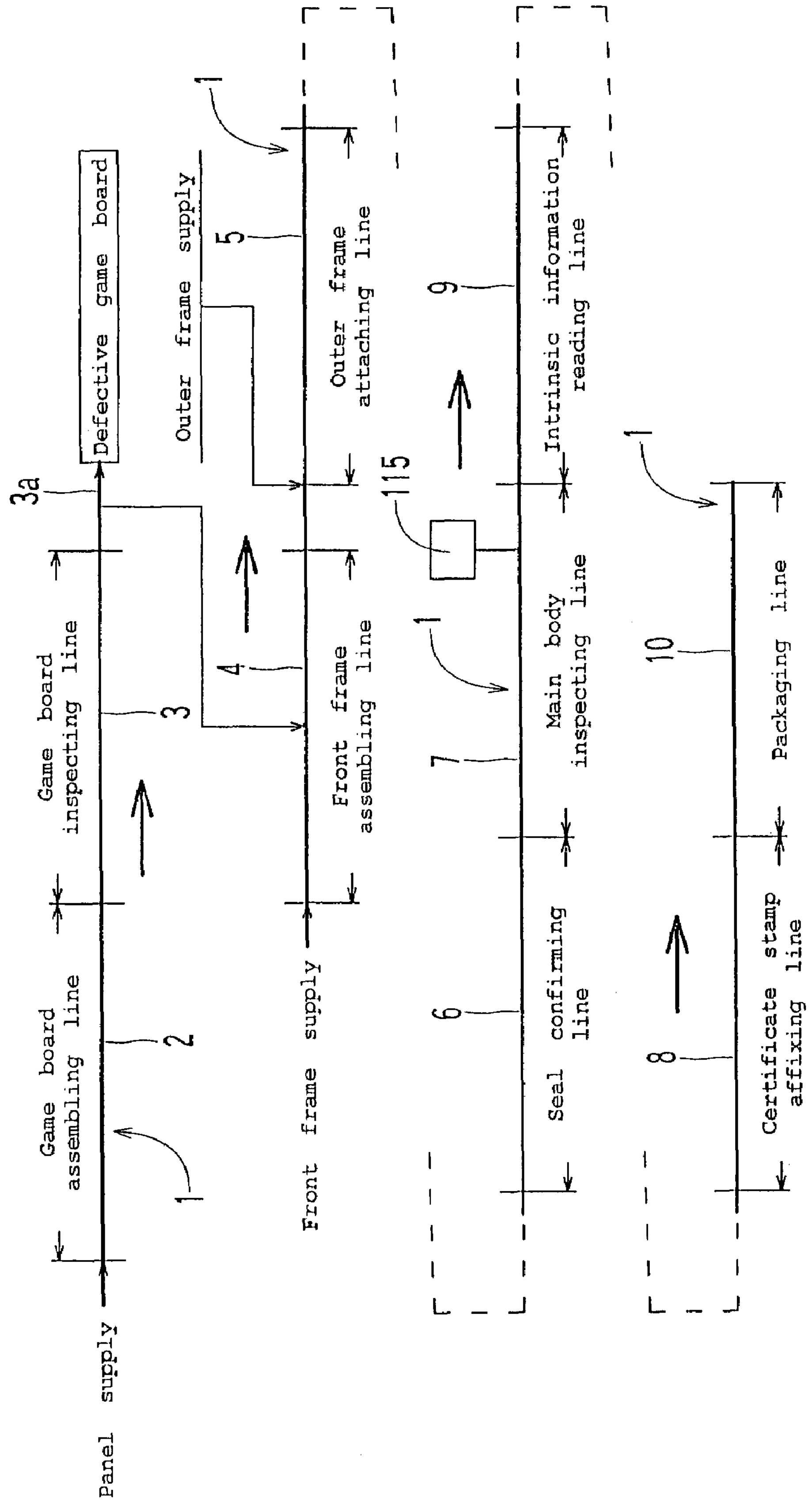
FIG. 12 is an explanatory view of a pachinko machine assembling line, showing a second embodiment of the invention.

FIG. 12 shows by way of example a second embodiment of the invention. In this embodiment, a certificate stamp affixing line 8 is installed downstream of the intrinsic information reading line 9, so that after the intrinsic information reading step 18 has been executed in the intrinsic information reading line 9, the certificate stamp affixing step 17 is executed in the certificate stamp affixing line 8.

In this case, since the certificate stamp affixing step 17 for affixing the management certificate stamp 51 to the main circuit board case 39 is executed after the intrinsic information reading step 18, the reading of the circuit board identification information 79 of the management certificate stamp 51 is not effected although the reading of the intrinsic identification information 48 on the electronic part 47 is effected in the intrinsic information reading step 18.

When a database for circuit board management is to be constructed on the basis of the circuit board identification information 79 and intrinsic identification information 48 as in the first embodiment, it is necessary to read the circuit board identification information 79 and the intrinsic identification information 48 in the intrinsic information reading step 18. However, in the case where the intrinsic identification information 48 is required but the circuit board identification information 79 is not required, the circuit board identification information 79 need not be read in the intrinsic information reading step 18.

Therefore, which intrinsic information is to be read in the intrinsic information reading step 18 depends on the form in which the data after the reading of the intrinsic information is utilized, and it is sufficient to read at least the intrinsic identification information 48 from the standpoint, e.g., of prevention of dishonest acts on the electronic part 47. In addition, it is possible to make an arrangement such that a circuit board identification information reading line is installed downstream of the certificate stamp affixing line 8, so that after the management certificate stamp 51 has been affixed, the circuit board identification information reading step is executed to read the circuit board identification information 79 on the management certificate stamp 51 in the circuit board identification information reading line.

The embodiments of the invention have so far been described, but the invention is not limited to these embodiments and various changes and modifications may be made in the invention without departing from the spirit and scope thereof. For example, each embodiment shows by way of example the case of employing an assembling line in which a series of operations from the assembling of the game board 23 in the game board assembling step 11 to the final step of completion of the pachinko machine 20 are continuously performed; however, in the case where after the assembling of the game board 23, the management certificate stamp 51 is affixed and the game board 23 as a single body is shipped, for example, in the case where after the assembling of the game board 23, the main circuit board case 39 associated therewith is sealed by the sealing means 49 and 50 and the management certificate stamp 51 is affixed, the invention may be likewise embodied in the assembling line for the game board 23.

Further, in the case where after the main control circuit board 38 has been put in the main circuit board case 39 for a game machine, the main circuit board case 39 is closed and sealed by the sealing means 49 and 50, the sealing state of the sealing means 49 and 50 may be confirmed and the intrinsic identification information 48 on the electronic part 47, etc., may be read at the point of time before the main circuit board case 39 is mounted on the game board 23.

It is desirable to continuously perform the seal confirming step 5 by the seal imaging means 87, etc., and the intrinsic information reading step 18 for the electronic part 47. However, seal-confirmed game boards 23 or pachinko machines 20 may be stocked and thereafter the stocked game boards 23 or pachinko machines 20 may be successively sent to the intrinsic information reading line 9 to have their intrinsic information read. Therefore, it may suffice if the sealed state of the main circuit board case 39 established by the sealing means 49 and 50 can be confirmed before the intrinsic information reading step 18 for the electronic part 47 of the game board 23 or pachinko machine 20 which is a subject of inspection.

In the case also where the invention is employed in the assembling line for the pachinko machine 20, the invention may be likewise embodied in the assembling line where game boards 23 are successively assembled in the game board assembling step 11 in the game board assembling line 2 and stocked and thereafter the stocked game boards 23 are taken out and mounted on the front frame 22 in the front frame assembling step 13.

In the case where there are defective places found in the main body inspecting step 16 in the main body inspection line 7, in the described embodiment, game boards 23, pachinko machines 20, etc., which are subjects of inspection are once removed from the transfer line 1 and transferred to the repairing table 115, where they are repaired, and then they are sent back to the transfer line 1 and transferred to the next step; however, pachinko machines 20 having defective places may be completely removed from the transfer line 1.

It is only necessary that the sealing means 49 and 50 be capable of sealing the main circuit board case 39 and that if they are opened after sealing, traces of opening remain in part of the sealing means 49 and 50 or main circuit board case 39. The arrangement for sealing the main circuit board case 39 may be employed by using other than the sealing pins 52-55 and 56-59. In view of the fact that in the case of the pachinko machine 20, the electronic part 47, such as an IC, mounted on main control circuit board 38 which controls the game actions on the game board 23 side is the most important, the case where the main circuit board case 39 is sealed by the sealing means 49 and 50 is illustrated; however, the sealing means may be likewise employed for various circuit board cases other than the main circuit board case 39. It may suffice if the main circuit board case 39 is capable of being opened/closed.

The database for management constructed in association with the model name of game machine, the date of manufacture, the date of shipment, the name of the destination game parlor, the date of reception, the intrinsic identification information 48, the circuit board identification information 79, and other necessary data may be made accessible from a plurality of manufacturing plants, the head office, sales offices, etc., through an electric communications line, e.g., the internet. In this case, it is desirable that database servers be provided in suitable places, including the head office, so that the intrinsic identification information 48, circuit board identification information 79, etc., obtained by the management machine 105 in each manufacturing plant may be transmitted to the database servers to enable the latter to manage the information in the lump.

Further, enabling the manufacturing plants, etc., to have the database for management in common in this manner makes it possible to quickly inform the corresponding manufacturing plants, etc., of information as when some of the parts are found defective. For example, when the fact that the predetermined lot of electronic part 47 has defects has been found in the predetermined manufacturing plant, the information can be quickly transmitted on the basis of the information, etc., in the database to the corresponding manufacturing plants using the electronic parts 47 in the same lot, enabling the production of the defective parts to be reduced to a minimum, preventing the defective parts from being delivered to the destination.

Further, in each embodiment, a pachinko machine 20 has been shown as an example of shot ball game machine. However, the invention may be likewise embodied in shot ball game machines, such as arrange ball machines and mahjong ball game machines, other than pachinko machines 20, and also in various game machines, such as rotary drum type game machines, other than shot ball game machines.

INDUSTRIAL APPLICABILITY

As described above, the game machine circuit board case inspection method, and a game board or game machine inspection method of the present invention are very useful for use in the assembling step and producing step for game machines, such as pachinko machines and rotary drum type game machines.

What is claimed is:

1. A game machine circuit board case inspection method for inspecting a circuit board case storing a control circuit board having a predetermined electronic part mounted thereon, the game machine circuit board case inspection method comprising:

sealing said circuit board case to said control circuit board by sealing a sealing device to form a sealed assembly sealing the predetermined electronic part on said control circuit board;

conveying said sealed assembly using a conveyor line;

a seal confirming step for confirming whether or not said circuit board case has been sealed, by the sealing device, using an imaging device to effect imaging of the sealing device sealing said circuit board case to the control circuit board, said seal confirming step being executed upon the sealed assembly while said sealed assembly is on said conveyor line;

an information reading step for reading intrinsic identification information on said predetermined electronic part sealed by said circuit board case and for reading circuit board identification information disposed on said sealed assembly after said seal confirming step confirms that said circuit board case has been sealed and while said sealed assembly is on said conveyor line; and developing a management database by storing said intrinsic identification information in association with said circuit board identification information.

2. A game board or game machine inspection method for inspecting a game board or game machine provided with a circuit board case for staring a control circuit board having a predetermined electronic part mounted thereon, the game board or game machine inspection method comprising:

sealing said circuit board case to said control circuit board by sealing a sealing device to form a sealed assembly sealing the predetermined electronic part on said control circuit board;

conveying said sealed assembly using a conveyor line;

a seal confirming step for confirming whether or not said circuit board case has been sealed, by said sealing device, using an imaging device to effect imaging of the sealing device sealing said circuit board case to the control circuit hoard, said seal confirming step being executed upon the sealed assembly while said sealed assembly is on said conveyor line;

an information reading step for reading the intrinsic identification information on said predetermined electronic part sealed in said circuit board case and for reading circuit board identification information disposed on said sealed assembly after said seal confirming step confirms that said circuit board case has been sealed and while said sealed assembly is on said conveyor line; and developing a management database by storing said intrinsic identification information in association with said circuit board identification information.

3. A game board or game machine inspection method as set forth in claim 2, wherein said seal confirming step includes said imaging imaging a sealing state of said sealing device, and a seal deciding step for analyzing image data obtained in said imaging step to decide whether or not said sealing device is sealed.

4. A game board or game machine inspection method as set forth in claim 2 or 3, wherein said information reading step includes said imaging imaging the intrinsic identification information on said predetermined electronic part, a data converting step for analyzing image data obtained in said imaging step to convert the image data into character data, and a storing step for storing said character data converted in said data converting step in a storing section containing said management database.

5. A game board or game machine inspection method as set forth claim 2 or 3, further comprising a removing step between said seal confirming step and said information reading step, said removing step comprising removing said game board or game machine in which said sealing said sealing device is determined to be not sealing said circuit board case by said confirming step.

6. A game board or game machine inspection method as set forth claim 2 or 3, further comprising a certificate stamp affixing step between said seal continuing step and said information reading step, said certificate stamp affixing step comprising affixing a management certificate stamp having the circuit board identification information written thereon to said circuit board case.

7. A game board or game machine inspection method as set forth in claim 6, wherein said information reading step includes said imaging the intrinsic identification information on said predetermined electronic part and said circuit board identification information written on the management certificate stamp on said circuit board case, a data converting step for analyzing image data obtained in the imaging and converting the image data into character data, and a storing step for storing said character data produced in said data converting step in a storing section containing said management database.

8. A game machine circuit board case inspection method for inspecting a circuit board case storing a control circuit board having a predetermined electronic part mounted thereon, the game machine circuit board case inspection method comprising:

sealing said circuit board case to said control circuit board by sealing a sealing device to form a sealed assembly sealing the predetermined electronic part on said control circuit board;

conveying said sealed assembly using a conveyor line;

a seal confirming step for confirming whether or not said circuit board case has been sealed, by the sealing device, using an imaging device to effect imaging of the sealing device sealing said circuit board case to the control circuit board, said seal confirming step being executed upon the sealed assembly while said sealed assembly is on said conveyor line;

an information reading step for reading intrinsic identification information on said predetermined electronic part sealed by said circuit board case and for reading circuit board identification information disposed on said sealed assembly after said seal confirming step confirms that said circuit board case has been sealed and while said sealed assembly is on said conveyor line; and a removing step between said seal confirming step and said information reading step, said removing step comprising removing said game board or game machine in which said sealing said sealing device is determined to be not sealing said circuit board case by said confirming step.

9. A game board or game machine inspection method as set forth in claim 8, wherein said seal confirming step includes said imaging imaging a sealing state of said sealing device, and a seal deciding step for analyzing image data obtained in said imaging step to decide whether or not said sealing device is sealed.

* * * * *